United States Patent
Musk et al.

(10) Patent No.: US 10,956,755 B2
(45) Date of Patent: Mar. 23, 2021

(54) ESTIMATING OBJECT PROPERTIES USING VISUAL IMAGE DATA

(71) Applicant: Tesla, Inc., Palo Alto, CA (US)

(72) Inventors: James Anthony Musk, San Francisco, CA (US); Swupnil Kumar Sahai, Saratoga, CA (US); Ashok Kumar Elluswamy, Sunnyvale, CA (US)

(73) Assignee: Tesla, Inc., Palo Alto, CA (US)

( * ) Notice: Subject to any disclaimer, the term of this patent is extended or adjusted under 35 U.S.C. 154(b) by 81 days.

(21) Appl. No.: 16/279,657

(22) Filed: Feb. 19, 2019

(65) Prior Publication Data
US 2020/0265247 A1    Aug. 20, 2020

(51) Int. Cl.
*G06K 9/00* (2006.01)
*G06T 7/70* (2017.01)
*G06N 20/00* (2019.01)

(52) U.S. Cl.
CPC ..... *G06K 9/00805* (2013.01); *G06K 9/00825* (2013.01); *G06N 20/00* (2019.01); *G06T 7/70* (2017.01); *G06T 2207/20081* (2013.01); *G06T 2207/30261* (2013.01)

(58) Field of Classification Search
CPC ..... G01S 17/50; G01S 17/89; G06K 9/00805; G06T 7/70
See application file for complete search history.

(56) References Cited

U.S. PATENT DOCUMENTS

| 2014/0368493 | A1* | 12/2014 | Rogan | G06K 9/00201 |
| | | | | 345/419 |
| 2017/0039732 | A1* | 2/2017 | Morifuji | G06T 15/50 |
| 2019/0004534 | A1* | 1/2019 | Huang | G06K 9/6289 |

FOREIGN PATENT DOCUMENTS

| EP | 3 438 872 | 2/2019 |
| WO | WO 19/012534 | 1/2019 |

OTHER PUBLICATIONS

International Search Report and Written Opinion dated May 28, 2020 in PCT/US2020/017290.

\* cited by examiner

*Primary Examiner* — John J Lee
(74) *Attorney, Agent, or Firm* — Knobbe, Martens, Olson & Bear, LLP (57) ABSTRACT

A system is comprised of one or more processors coupled to memory. The one or more processors are configured to receive image data based on an image captured using a camera of a vehicle and to utilize the image data as a basis of an input to a trained machine learning model to at least in part identify a distance of an object from the vehicle. The trained machine learning model has been trained using a training image and a correlated output of an emitting distance sensor.

23 Claims, 6 Drawing Sheets

ESTIMATING OBJECT PROPERTIES USING VISUAL IMAGE DATA

BACKGROUND OF THE INVENTION

Autonomous driving systems typically rely on mounting numerous sensors including a collection of vision and emitting distance sensors (e.g., radar sensor, lidar sensor, ultrasonic sensor, etc.) on a vehicle. The data captured by each sensor is then gathered to help understand the vehicle's surrounding environment and to determine how to control the vehicle. Vision sensors can be used to identify objects from captured image data and emitting distance sensors can be used to determine the distance of the detected objects. Steering and speed adjustments can be applied based on detected obstacles and clear drivable paths. But as the number and types of sensors increases, so does the complexity and cost of the system. For example, emitting distance sensors such as lidar are often costly to include in a mass market vehicle. Moreover, each additional sensor increases the input bandwidth requirements for the autonomous driving system. Therefore, there exists a need to find the optimal configuration of sensors on a vehicle. The configuration should limit the total number of sensors without limiting the amount and type of data captured to accurately describe the surrounding environment and safely control the vehicle.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A machine learning training technique for generating highly accurate machine learning results from vision data is disclosed. Using auxiliary sensor data, such as radar and lidar results, the auxiliary data is associated with objects identified from the vision data to accurately estimate object properties such as object distance. In various embodiments, the collection and association of auxiliary data with vision data is done automatically and requires little, if any, human intervention. For example, objects identified using vision techniques do not need to be manually labeled, significantly improving the efficiency of machine learning training. Instead, the training data can be automatically generated and used to train a machine learning model to predict object properties with a high degree of accuracy. For example, the data may be collected automatically from a fleet of vehicles by collecting snapshots of the vision data and associated related data, such as radar data. In some embodiments, only a subset of the vision-radar related association targets are sampled. The collected fusion data from the fleet of vehicles is automatically collected and used to train neural nets to mimic the captured data. The trained machine learning model can be deployed to vehicles for accurately predicting object properties, such as distance, direction, and velocity, using only vision data. For example, once the machine learning model has been trained to be able to determine an object distance using images of a camera without a need of a dedicated distance sensor, it may become no longer necessary to include a dedicated distance sensor in an autonomous driving vehicle. When used in conjunction with a dedicated distance sensor, this machine learning model can be used as a redundant or a secondary distance data source to improve accuracy and/or provide fault tolerance. The identified objects and corresponding properties can be used to implement autonomous driving features such as self-driving or driver-assisted operation of a vehicle. For example, an autonomous vehicle can be controlled to avoid a merging vehicle identified using the disclosed techniques.

A system comprising one or more processors coupled to memory is configured to receive image data based on an image captured using a camera of a vehicle. For example, a processor such as an artificial intelligence (AI) processor installed on an autonomous vehicle receives image data from a camera, such as a forward-facing camera of the vehicle. Additional cameras such as side-facing and rear-facing cameras can be used as well. The image data is utilized as a basis of an input to a machine learning trained model to at least in part identify a distance of an object from the vehicle. For example, the captured image is used as an input to a machine learning model such as a model of a deep learning network running on the AI processor. The model is used to predict the distance of objects identified in the image data. Surrounding objects such as vehicles and pedestrians can be identified from the image data and the accuracy and direction are inferred using a deep learning system. In various embodiments, the trained machine learning model has been trained using a training image and a correlated output of an emitting distance sensor. Emitting distance sensors may emit a signal (e.g., radio signal, ultrasonic signal, light signal, etc.) in detecting a distance of an object from the sensor. For example, a radar sensor mounted to a vehicle emits radar to identify the distance and direction of surrounding obstacles. The distances are then correlated to objects identified in a training image captured from the vehicle's camera. The associated training image is annotated with the distance measurements and used to train a machine learning model. In some embodiments, the model is used to predict additional properties such as an object's velocity. For example, the velocity of objects determined by radar is associated with objects in the training image to train a machine learning model to predict object velocities and directions.

In some embodiments, a vehicle is equipped with sensors to capture the environment of the vehicle and vehicle operating parameters. The captured data includes vision data (such as video and/or still images) and additional auxiliary data such as radar, lidar, inertia, audio, odometry, location, and/or other forms of sensor data. For example, the sensor data may capture vehicles, pedestrians, vehicle lane lines, vehicle traffic, obstacles, traffic control signs, traffic sounds, etc. Odometry and other similar sensors capture vehicle operating parameters such as vehicle speed, steering, orientation, change in direction, change in location, change in elevation, change in speed, etc. The captured vision and auxiliary data is transmitted from the vehicle to a training server for creating a training data set. In some embodiments, the transmitted vision and auxiliary data is correlated and used to automatically generate training data. The training data is used to train a machine learning model for generating highly accurate machine learning results. In some embodiments, a time series of captured data is used to generate the training data. A ground truth is determined based on a group of time series elements and is used to annotate at least one of the elements, such as a single image, from the group. For example, a series of images and radar data for a time period, such as 30 seconds, are captured. A vehicle identified from the image data and tracked across the time series is associated with a corresponding radar distance and direction from the time series. The associated auxiliary data, such as radar distance data, is associated with the vehicle after analyzing the image and distance data captured for the time series. By analyzing the image and auxiliary data across the time series, ambiguities such as multiple objects with similar distances can be resolved with a high degree of accuracy to determine a ground truth. For example, when using only a single captured image, there may be insufficient corresponding radar data to accurately estimate the different distances of two cars in the event one car occludes another or when two cars are close together. By tracking the cars over a time series, however, the distances identified by radar can be properly associated with the correct cars as the cars separate, travel in different directions, and/or travel at different speeds, etc. In various embodiments, once the auxiliary data is properly associated with an object, one or more images of the time series are converted to training images and annotated with the corresponding ground truth such as the distance, velocity, and/or other appropriate object properties.

In various embodiments, a machine learning model trained using auxiliary sensor data can accurately predict the result of an auxiliary sensor without the need for the physical auxiliary sensor. For example, training vehicles can be equipped with auxiliary sensors, including expensive and/or difficult to operate sensors, for collecting training data. The training data can then be used to train a machine learning model for predicting the result of an auxiliary sensor, such as a radar, lidar, or another sensor. The trained model is then deployed to vehicles, such as production vehicles, that only require vision sensors. The auxiliary sensors are not required but can be used as a secondary data source. There are many advantages to reducing the number of sensors including the difficulty in re-calibrating sensors, maintenance of the sensors, the cost of additional sensors, and/or additional bandwidth and computational requirements for additional sensors, among others. In some embodiments, the trained model is used in the case of auxiliary sensors failing. Instead of relying on additional auxiliary sensors, the trained machine learning model uses input from one or more vision sensors to predict the result of the auxiliary sensors. The predicted results can be used for implementing autonomous driving features that require detecting objects (e.g., pedestrians, stationary vehicles, moving vehicles, curbs, obstacles, road barriers, etc.) and their distance and direction. The predicted results can be used to detect the distance and direction of traffic control objects such as traffic lights, traffic signs, street signs, etc. Although vision sensors and object distance are used in the previous examples, alternative sensors and predicted properties are possible as well.

Figure 1:
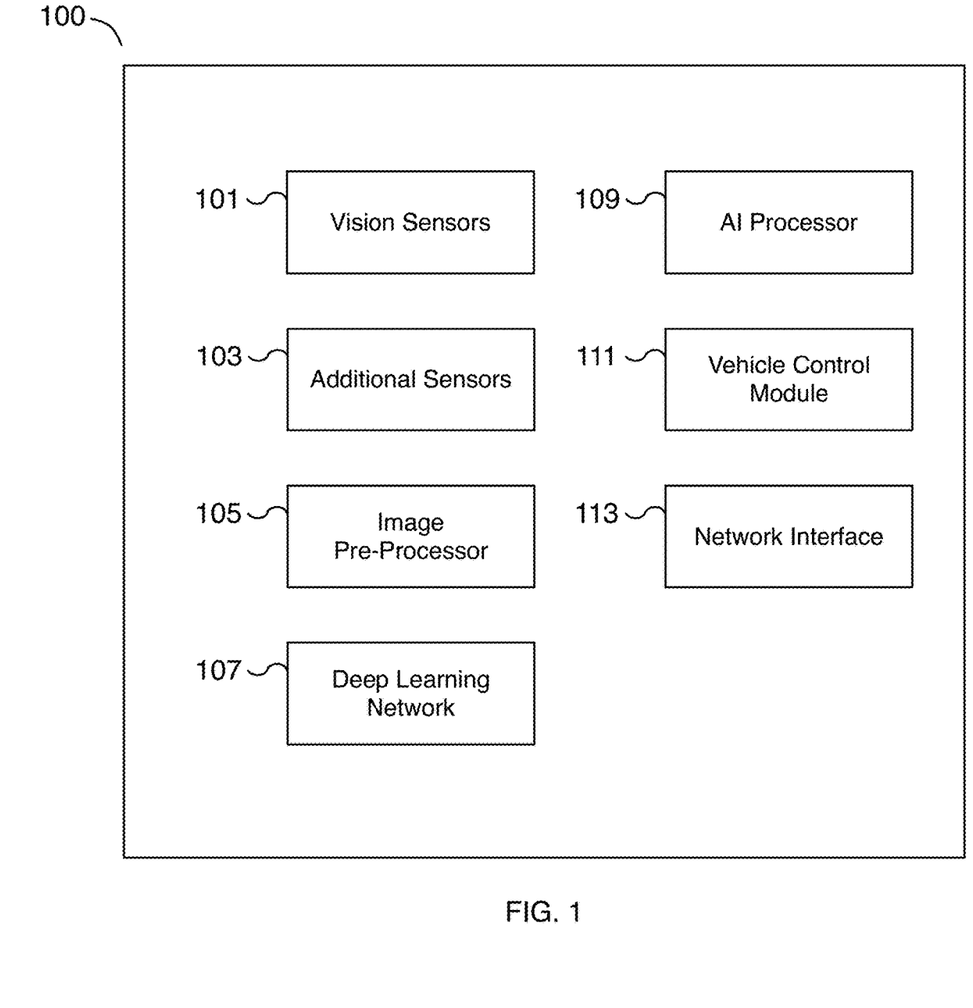
FIG. 1 is a block diagram illustrating an embodiment of a deep learning system for autonomous driving.

FIG. 1 is a block diagram illustrating an embodiment of a deep learning system for autonomous driving. The deep learning system includes different components that may be used together for self-driving and/or driver-assisted operation of a vehicle as well as for gathering and processing data for training a machine learning model. In various embodiments, the deep learning system is installed on a vehicle and data captured from the vehicle can be used to train and improve the deep learning system of the vehicle or other similar vehicles. The deep learning system may be used to implement autonomous driving functionality including identifying objects and predicting object properties such as distance and direction using vision data as input.

In the example shown, deep learning system 100 is a deep learning network that includes vision sensors 101, additional sensors 103, image pre-processor 105, deep learning network 107, artificial intelligence (AI) processor 109, vehicle control module 111, and network interface 113. In various embodiments, the different components are communicatively connected. For example, image data captured from vision sensors 101 is fed to image pre-processor 105. Processed sensor data of image pre-processor 105 is fed to deep learning network 107 running on AI processor 109. In some embodiments, sensor data from additional sensors 103 is used as an input to deep learning network 107. The output of deep learning network 107 running on AI processor 109 is fed to vehicle control module 111. In various embodiments, vehicle control module 111 is connected to and controls the operation of the vehicle such as the speed, braking, and/or steering, etc. of the vehicle. In various embodiments, sensor data and/or machine learning results can be sent to a remote server (not shown) via network interface 113. For example, sensor data, such as data captured from vision sensors 101 and/or additional sensors 103, can be transmitted to a remote training server via network interface 113 to collect training data for improving the performance, comfort, and/or safety of the vehicle. In various embodiments, network interface 113 is used to communicate with remote servers, to make phone calls, to send and/or receive text messages, and to transmit sensor data based on the operation of the vehicle, among other reasons. In some embodiments, deep learning system 100 may include additional or fewer components as appropriate. For example, in some embodiments, image pre-processor 105 is an optional component. As another example, in some embodiments, a post-processing component (not shown) is used to perform post-processing on the output of deep learning network 107 before the output is provided to vehicle control module 111.

In some embodiments, vision sensors 101 include one or more camera sensors for capturing image data. In various embodiments, vision sensors 101 may be affixed to a vehicle, at different locations of the vehicle, and/or oriented in one or more different directions. For example, vision sensors 101 may be affixed to the front, sides, rear, and/or roof, etc. of the vehicle in forward-facing, rear-facing, side-facing, etc. directions. In some embodiments, vision sensors 101 may be image sensors such as high dynamic range cameras and/or cameras with different fields of view. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras.

In some embodiments, vision sensors 101 are not mounted to the vehicle with vehicle control module 111. For example, vision sensors 101 may be mounted on neighboring vehicles and/or affixed to the road or environment and are included as part of a deep learning system for capturing sensor data. In various embodiments, vision sensors 101 include one or more cameras that capture the surrounding environment of the vehicle, including the road the vehicle is traveling on. For example, one or more front-facing and/or pillar cameras capture images of objects such as vehicles, pedestrians, traffic control objects, roads, curbs, obstacles, etc. in the environment surrounding the vehicle. As another example, cameras capture a time series of image data including image data of neighboring vehicles including those attempting to cut into the lane the vehicle is traveling in. Vision sensors 101 may include image sensors capable of capturing still images and/or video. The data may be captured over a period of time, such as a sequence of captured data over a period of time, and synchronized with other vehicle data including other sensor data. For example, image data used to identify objects may be captured along with radar and odometry data over a period of 15 seconds or another appropriate period.

In some embodiments, additional sensors 103 include additional sensors for capturing sensor data in addition to vision sensors 101. In various embodiments, additional sensors 103 may be affixed to a vehicle, at different locations of the vehicle, and/or oriented in one or more different directions. For example, additional sensors 103 may be affixed to the front, sides, rear, and/or roof, etc. of the vehicle in forward-facing, rear-facing, side-facing, etc. directions. In some embodiments, additional sensors 103 may be emitting sensors such as radar, ultrasonic, and/or lidar sensors. In some embodiments, additional sensors 103 include non-visual sensors. Additional sensors 103 may include radar, audio, lidar, inertia, odometry, location, and/or ultrasonic sensors, among others. For example, twelve ultrasonic sensors may be affixed to the vehicle to detect both hard and soft objects. In some embodiments, a forward-facing radar is utilized to capture data of the surrounding environment. In various embodiments, radar sensors are able to capture surrounding detail despite heavy rain, fog, dust, and other vehicles.

In some embodiments, additional sensors 103 are not mounted to the vehicle with vehicle control module 111. For example, similar to vision sensors 101, additional sensors 103 may be mounted on neighboring vehicles and/or affixed to the road or environment and are included as part of a deep learning system for capturing sensor data. In some embodiments, additional sensors 103 include one or more sensors that capture the surrounding environment of the vehicle, including the road the vehicle is traveling on. For example, a forward-facing radar sensor captures the distance data of objects in the forward field of view of the vehicle. Additional sensors may capture odometry, location, and/or vehicle control information including information related to vehicle trajectory. Sensor data may be captured over a period of time, such as a sequence of captured data over a period of time, and associated with image data captured from vision sensors 101. In some embodiments, additional sensors 103 include location sensors such as global position system (GPS) sensors for determining the vehicle's location and/or change in location. In various embodiments, one or more sensors of additional sensors 103 are optional and are included only on vehicles designed for capturing training data. Vehicles without one or more sensors of additional sensors 103 can simulate the results of additional sensors 103 by predicting the output using a trained machine learning model and the techniques disclosed herein. For example, vehicles without a forward-facing radar or lidar sensor can predict the results of the optional sensor using image data by applying a trained machine learning model, such as the model of deep learning network 107.

In some embodiments, image pre-processor 105 is used to pre-process sensor data of vision sensors 101. For example, image pre-processor 105 may be used to pre-process the sensor data, split sensor data into one or more components, and/or post-process the one or more components. In some embodiments, image pre-processor 105 is a graphics processing unit (GPU), a central processing unit (CPU), an image signal processor, or a specialized image processor. In various embodiments, image pre-processor 105 is a tone-mapper processor to process high dynamic range data. In some embodiments, image pre-processor 105 is implemented as part of artificial intelligence (AI) processor 109. For example, image pre-processor 105 may be a component of AI processor 109. In some embodiments, image pre-processor 105 may be used to normalize an image or to transform an image. For example, an image captured with a fisheye lens may be warped and image pre-processor 105 may be used to transform the image to remove or modify the warping. In some embodiments, noise, distortion, and/or blurriness is removed or reduced during a pre-processing step. In various embodiments, the image is adjusted or normalized to improve the result of machine learning analysis. For example, the white balance of the image is adjusted to account for different lighting operating conditions such as daylight, sunny, cloudy, dusk, sunrise, sunset, and night conditions, among others.

In some embodiments, deep learning network 107 is a deep learning network used for determining vehicle control parameters including analyzing the driving environment to determine objects and their corresponding properties such as distance, velocity, or another appropriate parameter. For example, deep learning network 107 may be an artificial neural network such as a convolutional neural network (CNN) that is trained on input such as sensor data and its output is provided to vehicle control module 111. As one example, the output may include at least a distance estimate of detected objects. As another example, the output may include at least potential vehicles that are likely to merge into the vehicle's lane, their distances, and their velocities. In some embodiments, deep learning network 107 receives as input at least image sensor data, identifies objects in the image sensor data, and predicts the distance of the objects. Additional input may include scene data describing the environment around the vehicle and/or vehicle specifications such as operating characteristics of the vehicle. Scene data may include scene tags describing the environment around the vehicle, such as raining, wet roads, snowing, muddy, high density traffic, highway, urban, school zone, etc. In some embodiments, the output of deep learning network 107 is a three-dimensional representation of a vehicle's surrounding environment including cuboids representing objects such as identified objects. In some embodiments, the output of deep learning network 107 is used for autonomous driving including navigating a vehicle towards a target destination.

In some embodiments, artificial intelligence (AI) processor 109 is a hardware processor for running deep learning network 107. In some embodiments, AI processor 109 is a specialized AI processor for performing inference using a convolutional neural network (CNN) on sensor data. AI processor 109 may be optimized for the bit depth of the sensor data. In some embodiments, AI processor 109 is optimized for deep learning operations such as neural network operations including convolution, dot-product, vector, and/or matrix operations, among others. In some embodiments, AI processor 109 is implemented using a graphics processing unit (GPU). In various embodiments, AI processor 109 is coupled to memory that is configured to provide the AI processor with instructions which when executed cause the AI processor to perform deep learning analysis on the received input sensor data and to determine a machine learning result, such as an object distance, used for autonomous driving. In some embodiments, AI processor 109 is used to process sensor data in preparation for making the data available as training data.

In some embodiments, vehicle control module 111 is utilized to process the output of artificial intelligence (AI) processor 109 and to translate the output into a vehicle control operation. In some embodiments, vehicle control module 111 is utilized to control the vehicle for autonomous driving. In various embodiments, vehicle control module 111 can adjust speed, acceleration, steering, braking, etc. of the vehicle. For example, in some embodiments, vehicle control module 111 is used to control the vehicle to maintain the vehicle's position within a lane, to merge the vehicle into another lane, to adjust the vehicle's speed and lane positioning to account for merging vehicles, etc.

In some embodiments, vehicle control module 111 is used to control vehicle lighting such as brake lights, turns signals, headlights, etc. In some embodiments, vehicle control module 111 is used to control vehicle audio conditions such as the vehicle's sound system, playing audio alerts, enabling a microphone, enabling the horn, etc. In some embodiments, vehicle control module 111 is used to control notification systems including warning systems to inform the driver and/or passengers of driving events such as a potential collision or the approach of an intended destination. In some embodiments, vehicle control module 111 is used to adjust sensors such as vision sensors 101 and additional sensors 103 of a vehicle. For example, vehicle control module 111 may be used to change parameters of one or more sensors such as modifying the orientation, changing the output resolution and/or format type, increasing or decreasing the capture rate, adjusting the captured dynamic range, adjusting the focus of a camera, enabling and/or disabling a sensor, etc. In some embodiments, vehicle control module 111 may be used to change parameters of image pre-processor 105 such as modifying the frequency range of filters, adjusting feature and/or edge detection parameters, adjusting channels and bit depth, etc. In various embodiments, vehicle control module 111 is used to implement self-driving and/or driver-assisted control of a vehicle. In some embodiments, vehicle control module 111 is implemented using a processor coupled with memory. In some embodiments, vehicle control module 111 is implemented using an application-specific integrated circuit (ASIC), a programmable logic device (PLD), or other appropriate processing hardware.

In some embodiments, network interface 113 is a communication interface for sending and/or receiving data including training data. In various embodiments, a network interface 113 includes a cellular or wireless interface for interfacing with remote servers, to transmit sensor data, to transmit potential training data, to receive updates to the deep learning network including updated machine learning models, to connect and make voice calls, to send and/or receive text messages, etc. For example, network interface 113 may be used to transmit sensor data captured for use as potential training data to a remote training server for training a machine learning model. As another example, network interface 113 may be used to receive an update for the instructions and/or operating parameters for vision sensors 101, additional sensors 103, image pre-processor 105, deep learning network 107, AI processor 109, and/or vehicle control module 111. A machine learning model of deep learning network 107 may be updated using network interface 113. As another example, network interface 113 may be used to update firmware of vision sensors 101 and additional sensors 103 and/or operating parameters of image pre-processor 105 such as image processing parameters.

Figure 2:
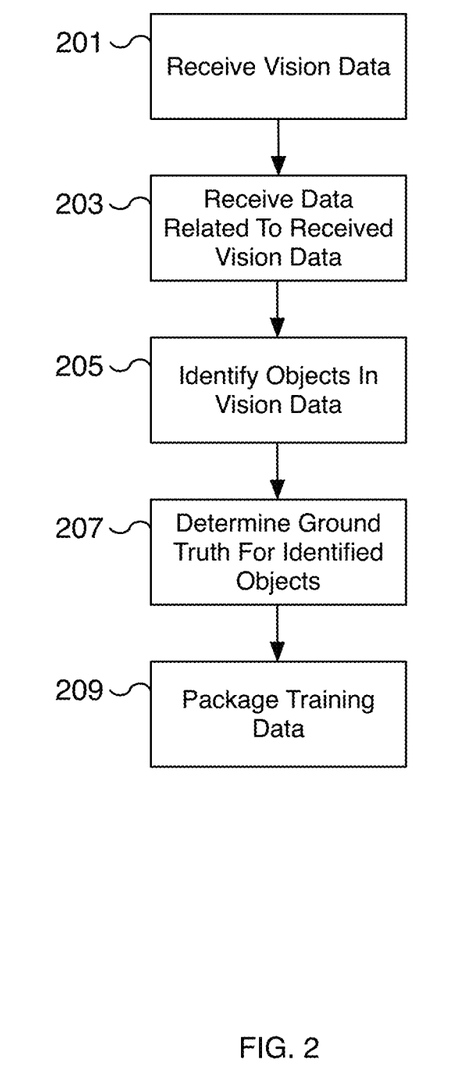
FIG. 2 is a flow diagram illustrating an embodiment of a process for creating training data for predicting object properties.

FIG. 2 is a flow diagram illustrating an embodiment of a process for creating training data for predicting object properties. For example, image data is annotated with sensor data from additional auxiliary sensors to automatically create training data. In some embodiments, a time series of elements made up of sensor and related auxiliary data is collected from a vehicle and used to automatically create training data. In various embodiments, the process of FIG. 2 is used to automatically label training data with corresponding ground truths. The ground truth and image data are packaged as training data to predict properties of objects identified from the image data. In various embodiments, the sensor and related auxiliary data are captured using the deep learning system of FIG. 1. For example, in various embodiments, the sensor data is captured from vision sensors 101 of FIG. 1 and related data is captured from additional sensors 103 of FIG. 1. In some embodiments, the process of FIG. 2 is performed to automatically collect data when existing predictions are incorrect or can be improved. For example, a prediction is made by an autonomous vehicle to determine one or more object properties, such as distance and direction, from vision data. The prediction is compared to distance data received from an emitting distance sensor. A determination can be made whether the prediction is within an acceptable accuracy threshold. In some embodiments, a determination is made that the prediction can be improved. In the event the prediction is not sufficiently accurate, the process of FIG. 2 can be applied to the prediction scenario to create a curated set of training examples for improving the machine learning model.

At 201, vision data is received. The vision data may be image data such as video and/or still images. In various embodiments, the vision data is captured at a vehicle and transmitted to a training server. The vision data may be captured over a period of time to create a time series of elements. In various embodiments, the elements include timestamps to maintain an ordering of the elements. By capturing a time series of elements, objects in the time series can be tracked across the time series to better disambiguate objects that are difficult to identify from a single input sample, such as a single input image and corresponding related data. For example, a pair of oncoming headlights may appear at first to both belong to a single vehicle but in the event the headlights separate, each headlight is identified as belonging to a separate motorcycle. In some scenarios, objects in the image data are easier to distinguish than objects in the auxiliary related data received at 203. For example, it may be difficult to disambiguate using only distance data the estimated distance of a van from a wall that the van is alongside of. However, by tracking the van across a corresponding time series of image data, the correct distance data can be associated with the identified van. In various embodiments, sensor data captured as a time series is captured in the format that a machine learning model uses as input. For example, the sensor data may be raw or processed image data.

In various embodiments, in the event a time series of data is received, the time series may be organized by associating a timestamp with each element of the time series. For example, a timestamp is associated with at least the first element in a time series. The timestamp may be used to calibrate time series elements with related data such as data received at 203. In various embodiments, the length of the time series may be a fixed length of time, such as 10 seconds, 30 seconds, or another appropriate length. The length of time may be configurable. In various embodiments, the time series may be based on the speed of the vehicle, such as the average speed of the vehicle. For example, at slower speeds, the length of time for a time series may be increased to capture data over a longer distance traveled than would be possible if using a shorter time length for the same speed. In some embodiments, the number of elements in the time series is configurable. The number of elements may be based on the distance traveled. For example, for a fixed time period, a faster moving vehicle includes more elements in the time series than a slower moving vehicle. The additional elements increase the fidelity of the captured environment and can improve the accuracy of the predicted machine learning results. In various embodiments, the number of elements is adjusted by adjusting the frames per second a sensor captures data and/or by discarding unneeded intermediate frames.

At 203, data related to the received vision data is received. In various embodiments, the related data is received at a training server along with the vision data received at 201. In some embodiments, the related data is sensor data from additional sensors of the vehicle, such as ultrasonic, radar, lidar, or other appropriate sensors. The related data may be distance, direction, velocity, location, orientation, change in location, change in orientation, and/or other related data captured by the vehicle's additional sensors. The related data may be used to determine a ground truth for features identified in the vision data received at 201. For example, distance and direction measurements from radar sensors are used to determine object distances and directions for objects identified in the vision data. In some embodiments, the related data received is a time series of data corresponding to a time series of vision data received at 201.

In some embodiments, the data related to the vision data includes map data. For example, offline data such as road and/or satellite level map data may be received at 203. The map data may be used to identify features such as roads, vehicle lanes, intersections, speed limits, school zones, etc. For example, the map data can describe the path of vehicle lanes. Using the estimated location of identified vehicles in vehicles lanes, estimated distances for the detected vehicles can be determined/corroborated. As another example, the map data can describe the speed limit associated with different roads of the map. In some embodiments, the speed limit data may be used to validate velocity vectors of identified vehicles.

At 205, objects in the vision data are identified. In some embodiments, the vision data is used as an input to identify objects in the surrounding environment of the vehicle. For example, vehicles, pedestrians, obstacles, etc. are identified from the vision data. In some embodiments, the objects are identified using a deep learning system with a trained machine learning model. In various embodiments, bounding boxes are created for identified objects. The bounding boxes may be two-dimensional bounding boxes or three-dimensional bounding boxes, such as cuboids, that outline the exterior of the identified object. In some embodiments, additional data is used to help identify the objects, such as the data received at 203. The additional data may be used to increase the accuracy in object identification.

At 207, a ground truth is determined for identified objects. Using the related data received at 203, ground truths are determined for the object identified at 205 from the vision data received at 201. In some embodiments, the related data is depth (and/or distance) data of the identified objects. By associating the distance data with the identified objects, a machine learning model can be trained to estimate object distances by using the related distance data as the ground truth for detected objects. In some embodiments, the distances are for detected objects such as an obstacle, a barrier, a moving vehicle, a stationary vehicle, traffic control signals, pedestrians, etc. and used as the ground truth for training. In addition to distance, the ground truth for other object parameters such as direction, velocity, acceleration, etc. may be determined. For example, accurate distances and directions are determined as ground truths for identified objects. As another example, accurate velocity vectors are determined as ground truths for identified objects, such as vehicles and pedestrians.

In various embodiments, vision data and related data are organized by timestamps and corresponding timestamps are used to synchronize the two data sets. In some embodiments, timestamps are used to synchronize a time series of data, such as a sequence of images and a corresponding sequence of related data. The data may be synchronized at capture time. For example, as each element of a time series is captured, a corresponding set of related data is captured and saved with the time series element. In various embodiments, the time period of the related data is configurable and/or matches the time period of the time series of elements. In some embodiments, the related data is sampled at the same rate as the time series elements.

In various embodiments, only by examining the time series of data can the ground truth be determined. For example, analysis of only a subset of vision data may misidentify objects and/or their properties. By expanding the analysis across the entire time series, ambiguities are removed. For example, an occluded vehicle may be revealed earlier or later in the time series. Once identified, the sometimes-occluded vehicle can be tracked throughout the entire time series, even when occluded. Similarly, object properties for the sometimes-occluded vehicle can be tracked throughout the time series by associating the object properties from the related data to the identified object in the vision data. In some embodiments, the data is played backwards (and/or forwards) to determine any points of ambiguity when associating related data to vision data. The objects at different times in the time series may be used to help determine object properties for the objects across the entire time series.

In various embodiments, a threshold value is used to determine whether to associate an object property as a ground truth of an identified object. For example, related data with a high degree of certainty is associated with an identified object while related data with a degree of certainty below a threshold value is not associated with the identified object. In some embodiments, the related data may be conflicting sensor data. For example, ultrasonic and radar data output may conflict. As another example, distance data may conflict with map data. The distance data may estimate a school zone begins in 30 meters while information from map data may describe the same school zone as starting in 20 meters. In the event the related data has a low degree of certainty, the related data may be discarded and not used to determine the ground truth.

In some embodiments, the ground truth is determined to predict semantic labels. For example, a detected vehicle can be labeled based on a predicted distance and direction as being in the left lane or right lane. In some embodiments, the detected vehicle can be labeled as being in a blind spot, as a vehicle that should be yielded to, or with another appropriate semantic label. In some embodiments, vehicles are assigned to roads or lanes in a map based on the determined ground truth. As additional examples, the determined ground truth can be used to label traffic lights, lanes, drivable space, or other features that assist autonomous driving.

At 209, the training data is packaged. For example, an element of vision data received at 201 is selected and associated with the ground truth determined at 207. In some embodiments, the element selected is an element of a time series. The selected element represents sensor data input, such as a training image, to a machine learning model and the ground truth represents the predicted result. In various embodiments, the selected data is annotated and prepared as training data. In some embodiments, the training data is packaged into training, validation, and testing data. Based on the determined ground truth and selected training element, the training data is packaged to train a machine learning model to predict the results related to one or more related auxiliary sensors. For example, the trained model can be used to accurately predict distances and directions of objects with results similar to measurements using sensors such as radar or lidar sensors. In various embodiments, the machine learning results are used to implement features for autonomous driving. The packaged training data is now available for training a machine learning model.

Figure 3:
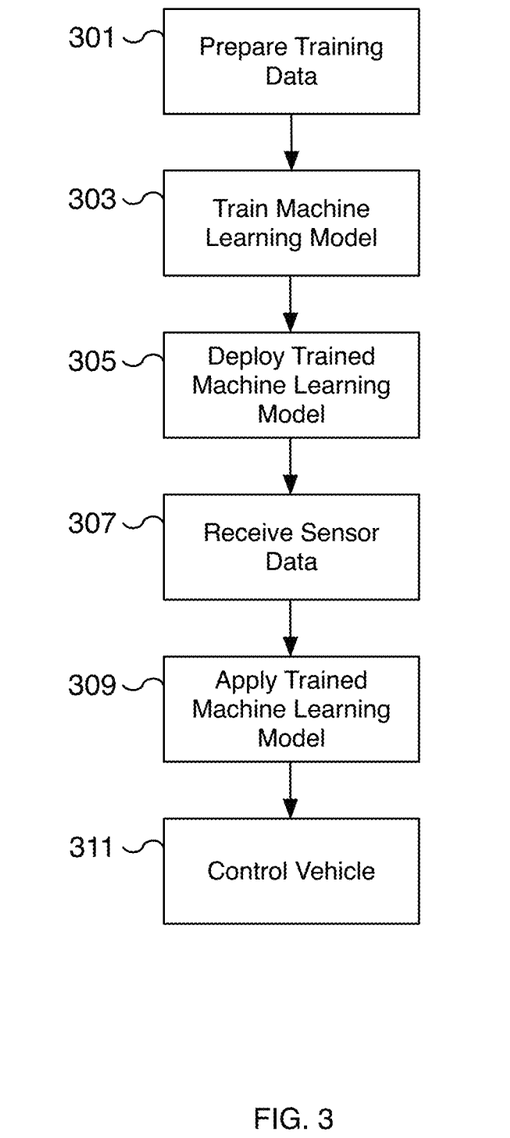
FIG. 3 is a flow diagram illustrating an embodiment of a process for training and applying a machine learning model for autonomous driving.

FIG. 3 is a flow diagram illustrating an embodiment of a process for training and applying a machine learning model for autonomous driving. For example, input data including a primary and secondary sensor data is received and processed to create training data for training a machine learning model. In some embodiments, the primary sensor data corresponds to image data captured via an autonomous driving system and the secondary sensor data corresponds to sensor data captured from an emitting distance sensor. The secondary sensor data may be used to annotate the primary sensor data to train a machine learning model to predict an output based on the secondary sensor. In some embodiments, the sensor data corresponds to sensor data captured based on particular use cases, such as the user manually disengaging autonomous driving or where distance estimates from vision data vary significantly from distance estimates from secondary sensors. In some embodiments, the primary sensor data is sensor data of vision sensors 101 of FIG. 1 and the secondary sensor data is sensor data of one or more sensors of additional sensors 103 of FIG. 1. In some embodiments, the process is used to create and deploy a machine learning model for deep learning system 100 of FIG. 1.

At 301, training data is prepared. In some embodiments, sensor data including image data and auxiliary data is received to create a training data set. The image data may include still images and/or video from one or more cameras. Additional sensors such as radar, lidar, ultrasonic, etc. may be used to provide relevant auxiliary sensor data. In various embodiments, the image data is paired with corresponding auxiliary data to help identify the properties of objects detected in the sensor data. For example, distance and/or velocity data from auxiliary data can be used to accurately estimate the distance and/or velocity of objects identified in the image data. In some embodiments, the sensor data is a time series of elements and is used to determine a ground truth. The ground truth of the group is then associated with a subset of the time series, such as a frame of image data. The selected element of the time series and the ground truth are used to prepare the training data. In some embodiments, the training data is prepared to train a machine learning model to only estimate properties of objects identified in the image data, such as the distance and direction of vehicles, pedestrians, obstacles, etc. The prepared training data may include data for training, validation, and testing. In various embodiments, the sensor data may be of different formats. For example, sensor data may be still image data, video data, radar data, ultrasonic data, audio data, location data, odometry data, etc. The odometry data may include vehicle operation parameters such as applied acceleration, applied braking, applied steering, vehicle location, vehicle orientation, the change in vehicle location, the change in vehicle orientation, etc. In various embodiments, the training data is curated and annotated for creating a training data set. In some embodiments, a portion of the preparation of the training data may be performed by a human curator. In various embodiments, a portion of the training data is generated automatically from data captured from vehicles, greatly reducing the effort and time required to build a robust training data set. In some embodiments, the format of the data is compatible with a machine learning model used on a deployed deep learning application. In various embodiments, the training data includes validation data for testing the accuracy of the trained model. In some embodiments, the process of FIG. 2 is performed at 301 of FIG. 3.

At 303, a machine learning model is trained. For example, a machine learning model is trained using the data prepared at 301. In some embodiments, the model is a neural network such as a convolutional neural network (CNN). In various embodiments, the model includes multiple intermediate layers. In some embodiments, the neural network may include multiple layers including multiple convolution and pooling layers. In some embodiments, the training model is validated using a validation data set created from the received sensor data. In some embodiments, the machine learning model is trained to predict an output of a sensor such as a distance emitting sensor from a single input image. For example, a distance and direction property of an object can be inferred from an image captured from a camera. As another example, a velocity vector of a neighboring vehicle including whether the vehicle will attempt to merge is predicted from an image captured from a camera.

At 305, the trained machine learning model is deployed. For example, the trained machine learning model is installed on a vehicle as an update for a deep learning network, such as deep learning network 107 of FIG. 1. In some embodiments, an over-the-air update is used to install the newly trained machine learning model. For example, an over-the-air update can be received via a network interface of the vehicle such as network interface 113 of FIG. 1. In some embodiments, the update is a firmware update transmitted using a wireless network such as a WiFi or cellular network. In some embodiments, the new machine learning model may be installed when the vehicle is serviced.

At 307, sensor data is received. For example, sensor data is captured from one or more sensors of the vehicle. In some embodiments, the sensors are vision sensors 101 of FIG. 1. The sensors may include image sensors such as a fisheye camera mounted behind a windshield, forward or side-facing cameras mounted in the pillars, rear-facing cameras, etc. In various embodiments, the sensor data is in the format or is converted into a format that the machine learning model trained at 303 utilizes as input. For example, the sensor data may be raw or processed image data. In some embodiments, the sensor data is preprocessed using an image pre-processor such as image pre-processor 105 of FIG. 1 during a pre-processing step. For example, the image may be normalized to remove distortion, noise, etc. In some alternative embodiments, the received sensor data is data captured from ultrasonic sensors, radar, LiDAR sensors, microphones, or other appropriate technology and used as the expected input to the trained machine learning model deployed at 305.

At 309, the trained machine learning model is applied. For example, the machine learning model trained at 303 is applied to sensor data received at 307. In some embodiments, the application of the model is performed by an AI processor such as AI processor 109 of FIG. 1 using a deep learning network such as deep learning network 107 of FIG. 1. In various embodiments, by applying the trained machine learning model, one or more object properties such as an object distance, direction, and/or velocity are predicted from image data. For example, different objects are identified in the image data and an object distance and direction for each identified object are inferred using the trained machine learning model. As another example, a velocity vector of a vehicle is inferred for a vehicle identified in the image data. The velocity vector may be used to determine whether the neighboring vehicle is likely to cut into the current lane and/or the likelihood the vehicle is a safety risk. In various embodiments, vehicles, pedestrians, obstacles, lanes, traffic control signals, map features, speed limits, drivable space, etc. and their related properties are identified by applying the machine learning model. In some embodiments, the features are identified in three-dimensions, such as a three-dimensional velocity vector.

At 311, the autonomous vehicle is controlled. For example, one or more autonomous driving features are implemented by controlling various aspects of the vehicle. Examples may include controlling the steering, speed, acceleration, and/or braking of the vehicle, maintaining the vehicle's position in a lane, maintaining the vehicle's position relative to other vehicles and/or obstacles, providing a notification or warning to the occupants, etc. Based on the analysis performed at 309, a vehicle's steering and speed may be controlled to maintain the vehicle safely between two lane lines and at a safe distance from other objects. For example, distances and directions of neighboring objects are predicted and a corresponding drivable space and driving path is identified. In various embodiments, a vehicle control module such as vehicle control module 111 of FIG. 1 controls the vehicle.

Figure 4:
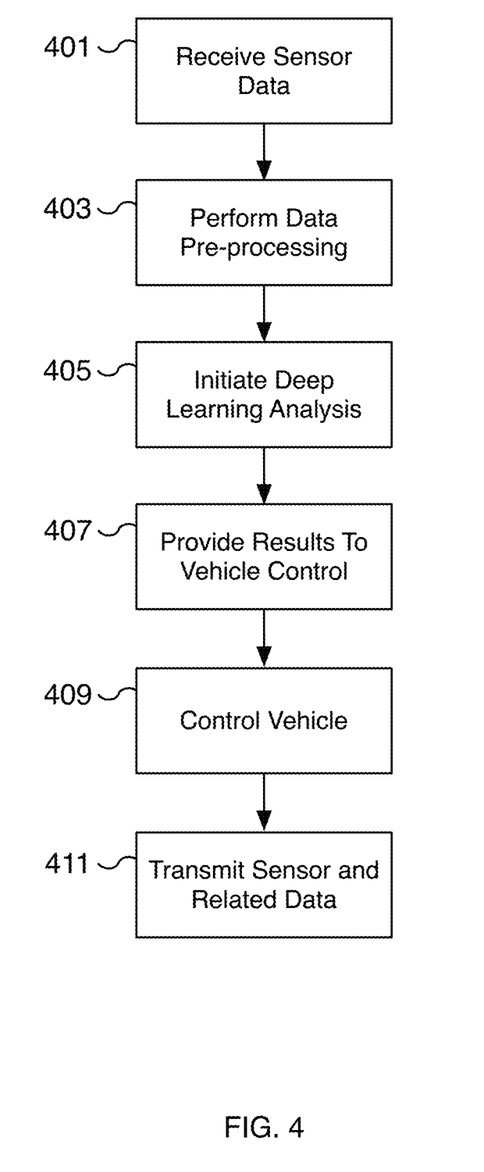
FIG. 4 is a flow diagram illustrating an embodiment of a process for training and applying a machine learning model for autonomous driving.

FIG. 4 is a flow diagram illustrating an embodiment of a process for training and applying a machine learning model for autonomous driving. In some embodiments, the process of FIG. 4 is utilized to collect and retain sensor data for training a machine learning model for autonomous driving. In some embodiments, the process of FIG. 4 is implemented on a vehicle enabled with autonomous driving whether the autonomous driving control is enabled or not. For example, sensor data can be collected in the moments immediately after autonomous driving is disengaged, while a vehicle is being driven by a human driver, and/or while the vehicle is being autonomously driven. In some embodiments, the techniques described by FIG. 4 are implemented using the deep learning system of FIG. 1. In some embodiments, portions of the process of FIG. 4 are performed at 307, 309, and/or 311 of FIG. 3 as part of the process of applying a machine learning model for autonomous driving.

At 401, sensor data is received. For example, a vehicle equipped with sensors captures sensor data and provides the sensor data to a neural network running on the vehicle. In some embodiments, the sensor data may be vision data, ultrasonic data, radar data, LiDAR data, or other appropriate sensor data. For example, an image is captured from a high dynamic range forward-facing camera. As another example, ultrasonic data is captured from a side-facing ultrasonic sensor. In some embodiments, a vehicle is affixed with multiple sensors for capturing data. For example, in some embodiments, eight surround cameras are affixed to a vehicle and provide 360 degrees of visibility around the vehicle with a range of up to 250 meters. In some embodiments, camera sensors include a wide forward camera, a narrow forward camera, a rear view camera, forward looking side cameras, and/or rearward looking side cameras. In some embodiments, ultrasonic and/or radar sensors are used to capture surrounding details. For example, twelve ultrasonic sensors may be affixed to the vehicle to detect both hard and soft objects.

In various embodiments, the captured data from different sensors is associated with captured metadata to allow the data captured from different sensors to be associated together. For example, the direction, field of view, frame rate, resolution, timestamp, and/or other captured metadata is received with the sensor data. Using the metadata, different formats of sensor data can be associated together to better capture the environment surrounding the vehicle. In some embodiments, the sensor data includes odometry data including the location, orientation, change in location, and/or change in orientation, etc. of the vehicle. For example, location data is captured and associated with other sensor data captured during the same time frame. As one example, the location data captured at the time that image data is captured is used to associate location information with the image data. In various embodiments, the received sensor data is provided for deep learning analysis.

At 403, the sensor data is pre-processed. In some embodiments, one or more pre-processing passes may be performed on the sensor data. For example, the data may be pre-processed to remove noise, to correct for alignment issues and/or blurring, etc. In some embodiments, one or more different filtering passes are performed on the data. For example, a high-pass filter may be performed on the data and a low-pass filter may be performed on the data to separate out different components of the sensor data. In various embodiments, the pre-processing step performed at 403 is optional and/or may be incorporated into the neural network.

At 405, deep learning analysis of the sensor data is initiated. In some embodiments, the deep learning analysis is performed on the sensor data received at 401 and optionally pre-processed at 403. In various embodiments, the deep learning analysis is performed using a neural network such as a convolutional neural network (CNN). In various embodiments, the machine learning model is trained offline using the process of FIG. 3 and deployed onto the vehicle for performing inference on the sensor data. For example, the model may be trained to predict object properties such as distance, direction, and/or velocity. In some embodiments, the model is trained to identify pedestrians, moving vehicles, parked vehicles, obstacles, road lane lines, drivable space, etc., as appropriate. In some embodiments, a bounding box is determined for each identified object in the image data and a distance and direction is predicted for each identified object. In some embodiments, the bounding box is a three-dimensional bounding box such as a cuboid. The bounding box outlines the exterior surface of the identified object and may be adjusted based on the size of the object. For example, different sized vehicles are represented using different sized bounding boxes (or cuboids). In some embodiments, the object properties estimated by the deep learning analysis are compared to properties measured by sensors and received as sensor data. In various embodiments, the neural network includes multiple layers including one or more intermediate layers and/or one or more different neural networks are utilized to analyze the sensor data. In various embodiments, the sensor data and/or the results of deep learning analysis are retained and transmitted at 411 for the automatic generation of training data.

In various embodiments, the deep learning analysis is used to predict additional features. The predicted features may be used to assist autonomous driving. For example, a detected vehicle can be assigned to a lane or road. As another example, a detected vehicle can be determined to be in a blind spot, to be a vehicle that should be yielded to, to be a vehicle in the left adjacent lane, to be a vehicle in the right adjacent lane, or to have another appropriate attribute. Similarly, the deep learning analysis can identify traffic lights, drivable space, pedestrians, obstacles, or other appropriate features for driving.

At 407, the results of deep learning analysis are provided to vehicle control. For example, the results are provided to a vehicle control module to control the vehicle for autonomous driving and/or to implement autonomous driving functionality. In some embodiments, the results of deep learning analysis at 405 are passed through one or more additional deep learning passes using one or more different machine learning models. For example, identified objects and their properties (e.g., distance, direction, etc.) may be used to determine drivable space. The drivable space is then used to determine a drivable path for the vehicle. Similarly, in some embodiments, a predicted vehicle velocity vector is detected. The determined path for the vehicle based at least in part on a predicted velocity vector is used to predict cut-ins and to avoid potential collisions. In some embodiments, the various outputs of deep learning are used to construct a three-dimensional representation of the vehicle's environment for autonomous driving which includes identified objects, the distance and direction of identified objects, predicted paths of vehicles, identified traffic control signals including speed limits, obstacles to avoid, road conditions, etc. In some embodiments, the vehicle control module utilizes the determined results to control the vehicle along a determined path. In some embodiments, the vehicle control module is vehicle control module 111 of FIG. 1.

At 409, the vehicle is controlled. In some embodiments, a vehicle with autonomous driving activated is controlled using a vehicle control module such as vehicle control module 111 of FIG. 1. The vehicle control can modulate the speed and/or steering of the vehicle, for example, to maintain a vehicle at a safe distance from other vehicles and in a lane at an appropriate speed in consideration of the environment around it. In some embodiments, the results are used to adjust the vehicle in anticipation that a neighboring vehicle will merge into the same lane. In various embodiments, using the results of deep learning analysis, a vehicle control module determines the appropriate manner to operate the vehicle, for example, along a determined path with the appropriate speed. In various embodiments, the result of vehicle controls such as a change in speed, application of braking, adjustment to steering, etc. are retained and used for the automatic generation of training data. In various embodiments, the vehicle control parameters may be retained and transmitted at 411 for the automatic generation of training data.

At 411, sensor and related data are transmitted. For example, the sensor data received at 401 along with the results of deep learning analysis at 405 and/or vehicle control parameters used at 409 are transmitted to a computer server for the automatic generation of training data. In some embodiments, the data is a time series of data and the various gathered data are associated together by a remote training computer server. For example, image data is associated with auxiliary sensor data, such as distance, direction, and/or velocity data, to generate a ground truth. In various embodiments, the collected data is transmitted wirelessly, for example, via a WiFi or cellular connection, from a vehicle to a training data center. In some embodiments, metadata is transmitted along with the sensor data. For example, metadata may include the time of day, a timestamp, the location, the type of vehicle, vehicle control and/or operating parameters such as speed, acceleration, braking, whether autonomous driving was enabled, steering angle, odometry data, etc. Additional metadata includes the time since the last previous sensor data was transmitted, the vehicle type, weather conditions, road conditions, etc. In some embodiments, the transmitted data is anonymized, for example, by removing unique identifiers of the vehicle. As another example, data from similar vehicle models is merged to prevent individual users and their use of their vehicles from being identified.

In some embodiments, the data is only transmitted in response to a trigger. For example, in some embodiments, an inaccurate prediction triggers the transmitting of image sensor and auxiliary sensor data for automatically collecting data to create a curated set of examples for improving the prediction of a deep learning network. For example, a prediction performed at 405 to estimate the distance and direction of a vehicle using only image data is determined to be inaccurate by comparing the prediction to distance data from an emitting distance sensor. In the event the prediction and actual sensor data differ by more than a threshold amount, the image sensor data and related auxiliary data are transmitted and used to automatically generate training data. In some embodiments, the trigger may be used to identify particular scenarios such as sharp curves, forks in the roads, lane merges, sudden stops, intersections, or another appropriate scenario where additional training data is helpful and may be difficult to gather. For example, a trigger can be based on the sudden deactivation or disengagement of autonomous driving features. As another example, vehicle operating properties such as the change in speed or change in acceleration can form the basis of a trigger. In some embodiments, a prediction with an accuracy that is less than a certain threshold triggers transmitting the sensor and related auxiliary data. For example, in certain scenarios, a prediction may not have a Boolean correct or incorrect result and is instead evaluated by determining an accuracy value of the prediction.

In various embodiments, the sensor and related auxiliary data are captured over a period of time and the entire time series of data is transmitted together. The time period may be configured and/or be based on one or more factors such as the speed of the vehicle, the distance traveled, the change in speed, etc. In some embodiments, the sampling rate of the captured sensor and/or related auxiliary data is configurable. For example, the sampling rate is increased at higher speeds, during sudden braking, during sudden acceleration, during hard steering, or another appropriate scenario when additional fidelity is needed.

Figure 5:
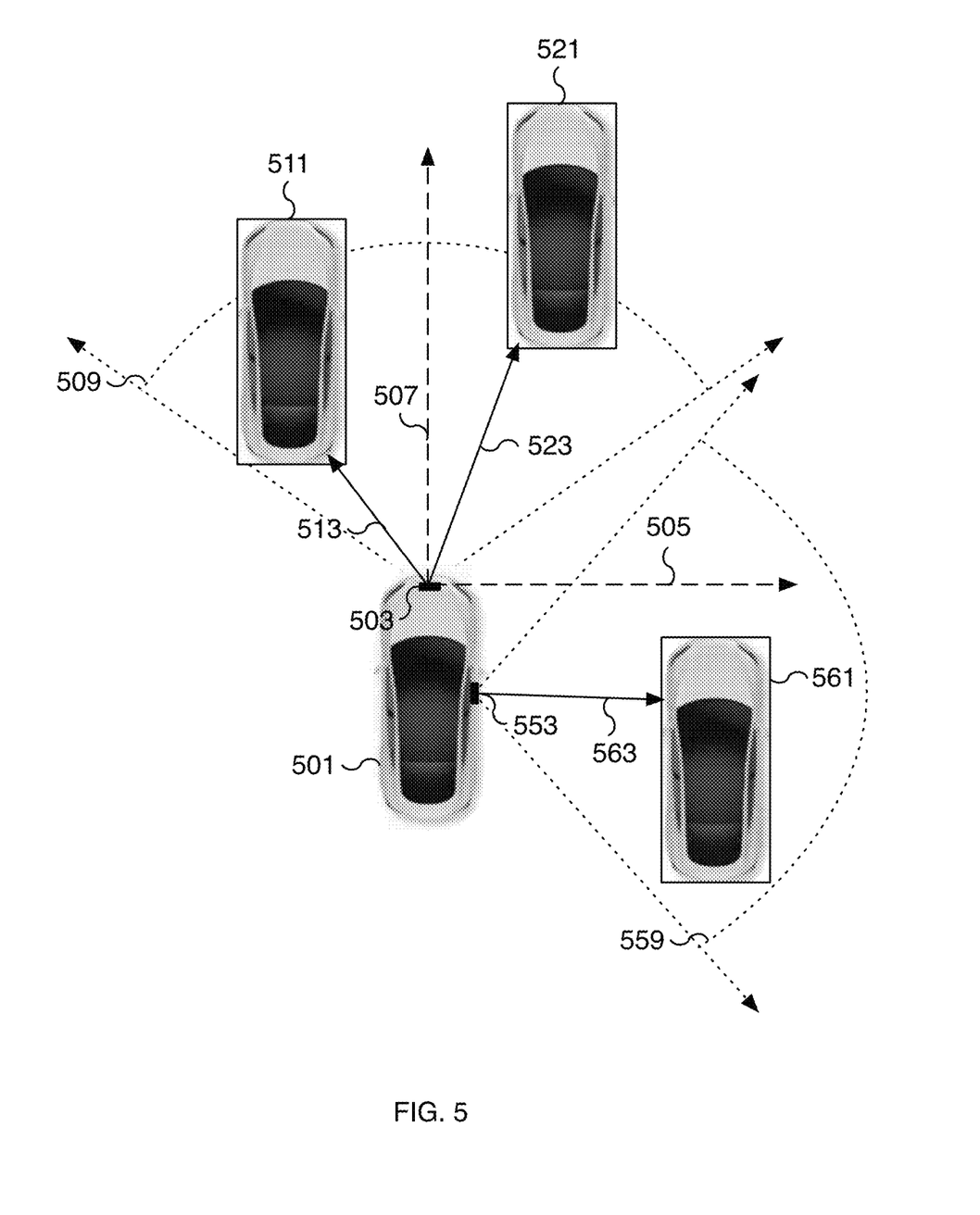
FIG. 5 is a diagram illustrating an example of capturing auxiliary sensor data for training a machine learning network.

FIG. 5 is a diagram illustrating an example of capturing auxiliary sensor data for training a machine learning network. In the example shown, autonomous vehicle 501 is equipped with at least sensors 503 and 553 and captures sensor data used to measure object properties of neighboring vehicles 511, 521, and 561. In some embodiments, the captured sensor data is captured and processed using a deep learning system such as deep learning system 100 of FIG. 1 installed on autonomous vehicle 501. In some embodiments, sensors 503 and 553 are additional sensors 103 of FIG. 1. In some embodiments, the data captured is the data related to vision data received at 203 of FIG. 2 and/or part of the sensor data received at 401 of FIG. 4.

In some embodiments, sensors 503 and 553 of autonomous vehicle 501 are emitting distance sensors such as radar, ultrasonic, and/or lidar sensors. Sensor 503 is a forward-facing sensor and sensor 553 is a right-side facing sensor. Additional sensors, such as rear-facing and left-side facing sensors (not shown) may be attached to autonomous vehicle 501. Axes 505 and 507, shown with long-dotted arrows, are reference axes of autonomous vehicle 501 and may be used as reference axes for data captured using sensor 503 and/or sensor 553. In the example shown, axes 505 and 507 are centered at sensor 503 and at the front of autonomous vehicle 501. In some embodiments, an additional height axis (not shown) is used to track properties in three-dimensions. In various embodiments, alternative axes may be utilized. For example, the reference axis may be the center of autonomous vehicle 501. In some embodiments, each sensor of sensors 503 and 553 may utilize its own reference axes and coordinate system. The data captured and analyzed using the respective local coordinate systems of sensors 503 and 553 may be converted into a local (or world) coordinate system of autonomous vehicle 501 so that the data captured from different sensors can be shared using the same frame of reference.

In the example shown, field of views 509 and 559 of sensors 503 and 553, respectively, are depicted by dotted arcs between dotted arrows. The depicted fields of views 509 and 559 show the overhead perspective of the regions measured by sensors 503 and 553, respectively. Properties of objects in field of view 509 may be captured by sensor 503 and properties of objects in field of view 559 may be captured by sensor 553. For example, in some embodiments, distance, direction, and/or velocity measurements of objects in field of view 509 are captured by sensor 503. In the example shown, sensor 503 captures the distance and direction of neighboring vehicles 511 and 521. Sensor 503 does not measure neighboring vehicle 561 since neighboring vehicle 561 is outside the region of field of view 509. Instead, the distance and direction of neighboring vehicle 561 is captured by sensor 553. In various embodiments, objects not captured by one sensor may be captured by another sensor of a vehicle. Although depicted in FIG. 5 with only sensors 503 and 553, autonomous vehicle 501 may be equipped with multiple surround sensors (not shown) that provide 360 degrees of visibility around the vehicle.

In some embodiments, sensors 503 and 553 capture distance and direction measurements. Distance vector 513 depicts the distance and direction of neighboring vehicle 511, distance vector 523 depicts the distance and direction of neighboring vehicle 521, and distance vector 563 depicts the distance and direction of neighboring vehicle 561. In various embodiments, the actual distance and direction values captured are a set of values corresponding to the exterior surface detected by sensors 503 and 553. In the example shown, the set of distances and directions measured for each neighboring vehicle are approximated by distance vectors 513, 523, and 563. In some embodiments, sensors 503 and 553 detect a velocity vector (not shown) of objects in their respective fields of views 509 and 559. In some embodiments, the distance and velocity vectors are three-dimensional vectors. For example, the vectors include height (or altitude) components (not shown).

In some embodiments, bounding boxes approximate detected objects including detected neighboring vehicles 511, 521, and 561. The bounding boxes approximate the exterior of the detected objects. In some embodiments, the bounding boxes are three-dimensional bounding boxes such as cuboids or another volumetric representation of the detected object. In the example of FIG. 5, the bounding boxes are shown as rectangles around neighboring vehicles 511, 521, and 561. In various embodiments, a distance and direction from autonomous vehicle 501 can be determined for each point on the edge (or surface) of a bounding box.

In various embodiments, distance vectors 513, 523, and 563 are related data to vision data captured in the same moment. The distance vectors 513, 523, and 563 are used to annotate distance and direction of neighboring vehicles 511, 521, and 561 identified in the corresponding vision data. For example, distance vectors 513, 523, and 563 may be used as the ground truth for annotating a training image that includes neighboring vehicles 511, 521, and 561. In some embodiments, the training image corresponding to the captured sensor data of FIG. 5 utilizes data captured from sensors with overlapping fields of view and captured at matching times. For example, in the event a training image is image data captured from a forward facing camera that only captures neighboring vehicles 511 and 521 and not neighboring vehicle 561, only neighboring vehicles 511 and 521 are identified in the training image and have their corresponding distance and directions annotated. Similarly, a right-side image capturing neighboring vehicle 561 includes annotations for the distance and direction of only neighboring vehicle 561. In various embodiments, annotated training images are transmitted to a training server for training a machine learning model to predict the annotated object properties. In some embodiments, the captured sensor data of FIG. 5 and corresponding vision data are transmitted to a training platform where they are analyzed and training images are selected and annotated. For example, the captured data may be a time series of data and the time series is analyzed to associate the related data to objects identified in the vision data.

Figure 6:
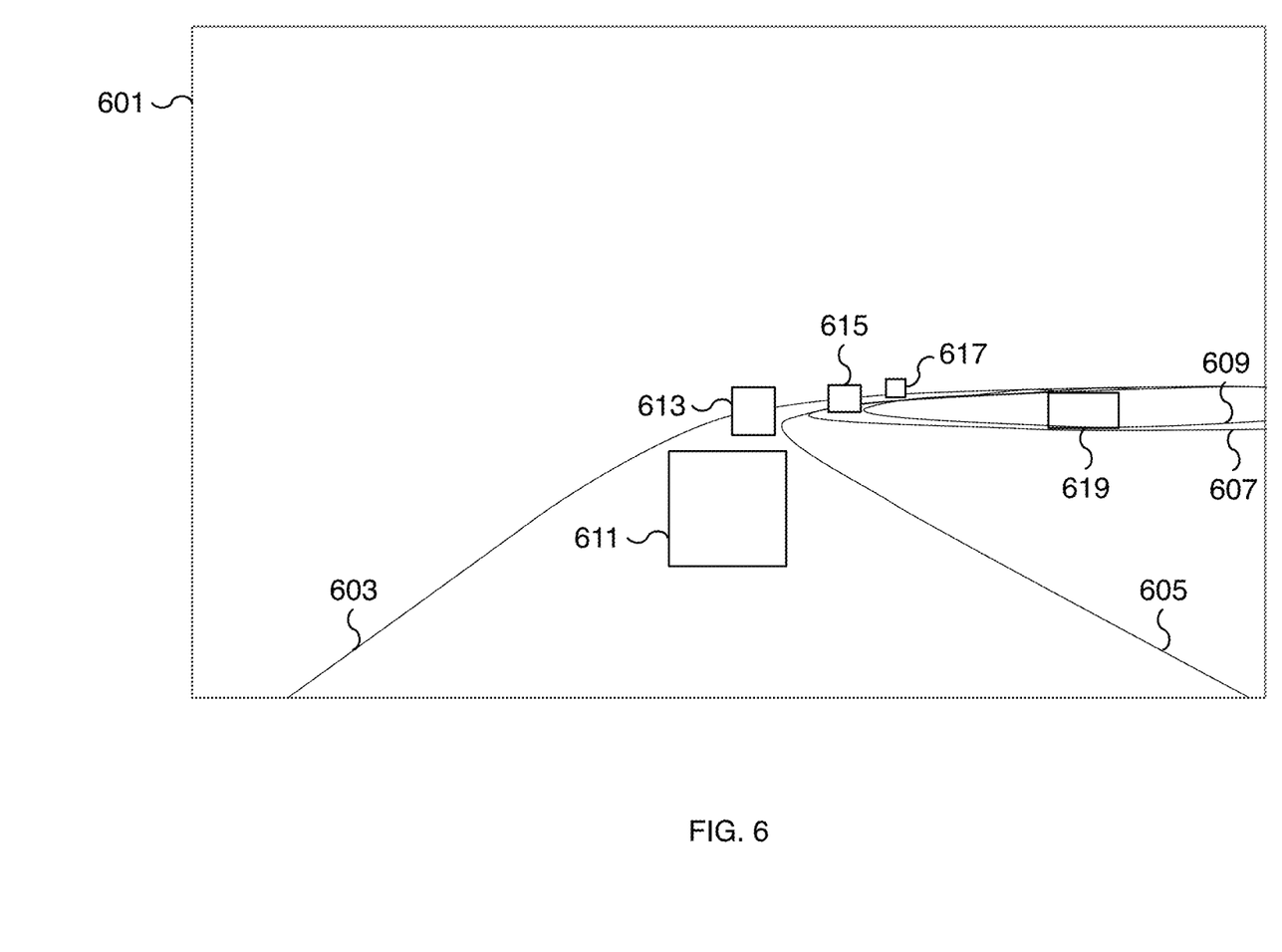
FIG. 6 is a diagram illustrating an example of predicting object properties.

FIG. 6 is a diagram illustrating an example of predicting object properties. In the example shown, analyzed vision data 601 represents the perspective of image data captured from a vision sensor, such as a forward-facing camera, of an autonomous vehicle. In some embodiments, the vision sensor is one of vision sensors 101 of FIG. 1. In some embodiments, the vehicle's forward environment is captured and processed using a deep learning system such as deep learning system 100 of FIG. 1. In various embodiments, the process illustrated in FIG. 6 is performed at 307, 309, and/or 311 of FIG. 3 and/or at 401, 403, 405, 407, and/or 409 of FIG. 4.

In the example shown, analyzed vision data 601 captures the forward facing environment of an autonomous vehicle. Analyzed vision data 601 includes detected vehicle lane lines 603, 605, 607, and 609. In some embodiments, the vehicle lane lines are identified using a deep learning system such as deep learning system 100 of FIG. 1 trained to identify driving features. Analyzed vision data 601 also includes bounding boxes 611, 613, 615, 617, and 619 that correspond to detected objects. In various embodiments, the detected objects represented by bounding boxes 611, 613, 615, 617, and 619 are identified by analyzing captured vision data. Using the captured vision data as input to a trained machine learning model, object properties such as distances and direction of the detected objects are predicted. In some embodiments, velocity vectors are predicted. In the example shown, the detected objects of bounding boxes 611, 613, 615, 617, and 619 correspond to neighboring vehicles. Bounding boxes 611, 613, and 617 correspond to vehicles in the lane defined by vehicle lane lines 603 and 605. Bounding boxes 615 and 619 correspond to vehicles in the merging lane defined by vehicle lane lines 607 and 609. In some embodiments, bounding boxes used to represent detected objects are three-dimensional bounding boxes (not shown).

In various embodiments, the object properties predicted for bounding boxes 611, 613, 615, 617, and 619 are predicted by applying a machine learning model trained using the processes of FIGS. 2-4. The object properties predicted may be captured using auxiliary sensors as depicted in the diagram of FIG. 5. Although FIG. 5 and FIG. 6 depict different driving scenarios—FIG. 5 depicts a different number of detected objects and in different positions compared to FIG. 6—a trained machine learning model can accurately predict object properties for the objects detected in the scenario of FIG. 6 when trained on sufficient training data. In some embodiments, the distance and direction is predicted. In some embodiments, the velocity is predicted. The predicted properties may be predicted in two or three-dimensions. By automating the generation of training data using the processes described with respect to FIGS. 1-6, training data for accurate predictions is generated in an efficient and expedient manner. In some embodiments, the identified objects and corresponding properties can be used to implement autonomous driving features such as self-driving or driver-assisted operation of a vehicle. For example, a vehicle's steering and speed may be controlled to maintain the vehicle safely between two lane lines and at a safe distance from other objects.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive image data based on an image captured using a camera of a vehicle, the image data depicting an object within the vehicle's surrounding environment; and
utilize the image data as input to a trained machine learning model, the trained machine learning model outputting a distance from the vehicle to the object, wherein the trained machine learning model is configured to output the distance using only the image data;
and wherein the trained machine learning model was trained using a training image and a correlated output of an emitting distance sensor; and a memory coupled to the one or more processors.

2. The system of claim 1, wherein the the trained machine learning model outputs a direction of the object with respect to the vehicle.

3. The system of claim 1, wherein the one or more processors are further configured to identify a velocity vector of the object with respect to the vehicle.

4. The system of claim 1, wherein the emitting distance sensor includes a radar sensor.

5. The system of claim 1, wherein the emitting distance sensor includes an ultrasonic sensor.

6. The system of claim 1, wherein the emitting distance sensor includes a lidar sensor.

7. The system of claim 1, wherein the object is one of the following: a pedestrian, a vehicle, an obstacle, a barrier, or a traffic control object.

8. The system of claim 1, wherein the training image and the correlated output of the emitting distance sensor were captured on a training vehicle.

9. The system of claim 8, wherein the output of the emitting distance sensor includes an estimated distance of a second object from the training vehicle and an estimated direction of the second object with respect to the training vehicle, and wherein the second object is identified in the training image.

10. The system of claim 9, wherein the training image is one of a time series of images captured using an image sensor of the training vehicle.

11. The system of claim 10, wherein the second object is identified at least in part by analyzing a plurality of images included in the time series of images.

12. The system of claim 10, wherein the time series of images is used to disambiguate an output portion of the emitting sensor corresponding to the second object among a plurality of objects detected by the emitting distance sensor.

13. The system of claim 1, wherein the identified distance of the object from the vehicle is used to predict a semantic label associated with the object.

14. The system of claim 1, wherein the trained machine learning model was trained to predict a distance output of the emitting distance sensor based on an input image.

15. The system of claim 1, wherein the distance of the object identified using the trained machine learning model is used in combination with an output of an installed emitting distance sensor included on the vehicle to determine a relative location of the object with respect to the vehicle.

16. The system of claim 1, wherein the trained machine learning model outputs a plurality of distances corresponding to points on a bounding box associated with the object as depicted in the image data.

17. A computer program product, the computer program product being embodied in a non-transitory computer readable storage medium and comprising computer instructions for:
   receiving image data based on an image captured using a camera of a vehicle, the image data depicting an object within the vehicle's surrounding environment; and
   utilizing the image data as input to a trained machine learning model, the trained machine learning model outputting a distance from the vehicle to the object, wherein the trained machine learning model is configured to output the distance using only the image data, and wherein the trained machine learning model was trained using a training image and a correlated output of an emitting distance sensor.

18. The computer program product of claim 17, wherein the trained machine learning model outputs a plurality of distances corresponding to points on a bounding box associated with the object as depicted in the image data.

19. A method, comprising:
   receiving a selected image based on an image captured using a camera of a vehicle;
   receiving distance data based on an emitting distance sensor of the vehicle;
   identifying an object using the selected image as an input to a trained machine learning model;
   extracting a distance estimate of the identified object from the received distance data;
   creating a training image by annotating the selected image with the extracted distance estimate;
   training a second machine learning model to predict a distance measurement using a training data set that includes the training image; and
   providing the trained second machine learning model to a second vehicle equipped with a second camera.

20. The method of claim 19, wherein the captured image is part of a time series of captured images and the distance data is part of a time series of captured distance data.

21. The method of claim 20, further comprising tracking the identified object across the time series of captured images and wherein the extracted distance estimate is based on correlating the tracked identified object to the received distance data.

22. The method of claim 19, wherein the identified object is a detected vehicle or a pedestrian.

23. A method implemented by a processor included in a vehicle, the method comprising:
   receiving image data based on an image captured using a camera of the vehicle, the image data depicting an object within the vehicle's surrounding environment; and
   utilizing the image data as input to a trained machine learning model, the trained machine learning model outputting a distance from the vehicle to the object, wherein the trained machine learning model is configured to output the distance without using distance information from a first emitting distance sensor,
   and wherein the trained machine learning model was trained using a training image and a correlated output of a second emitting distance sensor.

* * * * *

UNITED STATES PATENT AND TRADEMARK OFFICE
CERTIFICATE OF CORRECTION

PATENT NO. : 10,956,755 B2
APPLICATION NO. : 16/279657
DATED : March 23, 2021
INVENTOR(S) : James Anthony Musk Page 1 of 1

It is certified that error appears in the above-identified patent and that said Letters Patent is hereby corrected as shown below:

In the Claims

In Column 20, Line 25, Claim 2, delete "the the" and insert --the--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*